Figure 1:
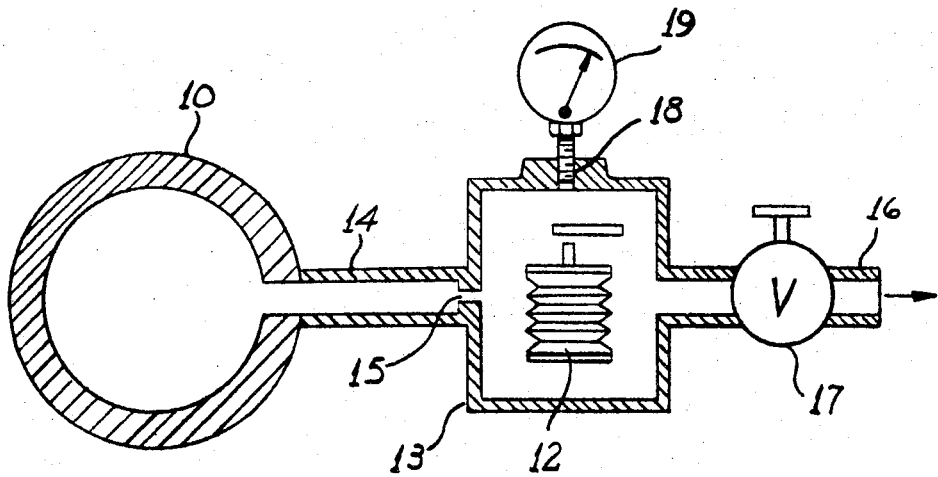

United States Patent [19]
Brian

[11] 3,713,325
[45] Jan. 30, 1973

[54] PRESSURE SENSING DEVICE TESTING MEANS

[76] Inventor: Joseph M. Brian, 428 Carlyle Avenue, Montreal, Quebec, Canada

[22] Filed: Aug. 20, 1971

[21] Appl. No.: 173,545

[30] Foreign Application Priority Data

June 3, 1971 Canada.................................114761

[52] U.S. Cl. ................................................73/4 R
[51] Int. Cl. ............................................G01l 27/00
[58] Field of Search ................................73/4 R, 168

[56] References Cited

UNITED STATES PATENTS 3,398,570   8/1968   Cowan et al...............................73/4

*Primary Examiner*—S. Clement Swisher
*Attorney*—Fetherstonhaugh et al.

[57] ABSTRACT

A pressure sensing device has a casing which communicates through a restricted orifice with a pressurized fluid line. A testing gauge is either fixed or removably connected to the casing and a variable flow valve communicates the casing with the atmosphere. The flow rate through the valve is substantially greater than the flow into the casing through the restricted orifice, thus permitting control of the pressure in the casing. Thus the pressure sensing device may be tested without removing it from the fluid line and without materially affecting the fluid pressure in the line.

3 Claims, 2 Drawing Figures

PATENTED JAN 30 1973 3,713,325

INVENTOR
Joseph M. BRIAN

Fetherstonhaugh & Co.
PATENT AGENTS

PRESSURE SENSING DEVICE TESTING MEANS

This invention relates to new and useful improvements in apparatus for testing pressure sensing devices such as switches, transducers and the like which are embodied in pneumatic or hydraulic systems for automatically detecting pressure changes in pressurized fluid systems.

It is often necessary to check or change the pressure setting of such a pressure sensing device, and to do this it is necessary to either remove the device from the system or to alter the pressure in the fluid line. In the instance of large pressure vessels or pressurized telephone or other communication cables or conduits it is a tedious and an expensive procedure to significantly raise or lower the line pressure so that a check or a setting adjustment of the pressure sensing device can be made.

It is, therefore the principal object of the invention to provide an arrangement whereby a pressure sensing device embodied in a pneumatic or hydraulic system may be quickly and easily tested and/or its pressure setting adjusted without the necessity of removing the same from the system and also without materially affecting the fluid pressure in the line with which the device is associated.

The invention is particularly useful for testing pressure sensing devices which are permanently installed at spaced points along telephone lines or cables. Such lines or cables are usually pressurized in order to keep out moisture and the permanently installed devices automatically detect changes in pressure and thus possible leaks. However, the use of the invention is not restricted to this particular environment and the invention may be employed in pneumatic or hydraulic systems in general, where a pressure sensing device is associated with a line carrying pressurized fluid flow or static fluid pressure.

Figure 2:
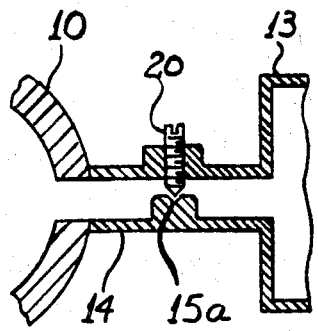

With the foregoing more important object and features in view and such other objects and features which may become apparent as this specification proceeds, the invention will be understood from the following description taken in conjunction with the accompanying drawings, where like characters or reference designate like parts, and wherein:

FIG. 1 is a partly diagrammatic sectional view showing one embodiment of the invention; and FIG. 2 is a fragmentary view of a slightly modified embodiment.

Referring now the accompanying drawings in detail, and more particularly to FIG. 1, the reference character 10 designates a line such as a cable, conduit, pipe, or the like, carrying fluid under pressure, either as a pressurized flow or, as in the instance of telephone lines or cables, under static pressure.

A pressure sensing device 12, such as for example a pressure switch or a pressure transducer, or the like, is provided at one or more points along the length of the line 10, the device 12 being used to automatically detect fluid pressure changes and possible leaks in the line, as is customary in the art. For general illustrative purposes the sensing device 12 is shown as being contained in a casing 13, the interior of which communicates with the interior of the line 10 through a suitable connection 14 so that the device 12 is subjected to fluid pressure existing in the line.

It is desirable to occasionally test the sensing device 12 for accuracy of its setting or to adjust it from one setting to another. In conventional practice it was necessary to remove the device from the system for this purpose, or, if it remained in place, to raise and lower the fluid pressure in the line 10 significantly so that a check or a setting adjustment of the device could be made. Particularly in the instance of telephone cable, such a procedure was very tedious and expensive, but with the present invention the sensing device may be quickly and easily set or adjusted or tested, without the necessity of removing it from the system and also without materially affecting the line pressure.

In accordance with the invention a restricted flow orifice 15 is provided between the line 10 and the casing 13 of the device 12, as for example in the connection 14. The casing 13 is provided with a fluid outlet 16 communicating with the atmosphere or some other pressure reference, and a variable flow valve 17 is provided in the outlet 16. Additionally the casing 13 has an attachment point 18 to accommodate a fixed or removable pressure testing gauge 19. When the gauge is removed, the opening 18 is closed by a suitable plug or check valve (not shown), and under normal operating conditions of the system the valve 17 is closed.

However, when the sensing device 12 is to be tested or its pressure setting is to be changed, the test gauge 19 is used to indicate the fluid pressure in the casing. The valve 17 is then opened to a greater or lesser extent, thus permitting fluid to flow from the casing 13 through the outlet 16 to the atmosphere, with a resultant variation of fluid pressure in the casing.

Characteristically, the size of the restricted orifice 15 is such that the flow capacity of the outlet valve 17 is substantially greater than the flow rate through the restricted orifice 15 and thus it is possible to quickly drop the pressure in the casing 13 without materially affecting the pressure existing in the line 10. By adjusting the valve 17 the pressure in the casing 13 may be controlled to any desired value for checking the setting or performance of the sensing device 12 in relation to the testing gauge 19.

Typically, the flow capacity of the outlet valve 17 may be from 2 to 4 times greater than the flow rate through the orifice 15 for a given pressure drop. As determined by prerequisites of the system, the orifice 15 may be of a fixed size as in FIG. 1. However, under some conditions or in some systems it may be desirable to pre-adjust the size of the restricted orifice, which may be done as exemplified in FIG. 2 wherein the orifice or passage 15a is adjustable as to flow rate by an adjustment screw 20. Of course, once the size of the orifice 15a is pre-adjusted, its setting need not be disturbed while the outlet valve 17 is manipulated during the testing procedure.

It may be emphasized that the structure shown in the drawings is for illustrative purposes only and that in actual practice the arrangement may be quite different while still embodying the principles of the invention. Thus for example, the outlet valve 17 and the test gauge 19 may be applied to the sensing device casing 13 by means of one, common adapter fitting. Also, the connection of the sensing device casing to the line 10 may embody the restrictive orifice 15 as a part of the initial installation of the permanent sensing device.

Accordingly, while in the foregoing there has been described and shown an embodiment of the invention, various modifications and equivalents may be resorted to within the spirit and scope of the invention as claimed.

The embodiments of the invention in which an exclusive property or privilege is claimed are defined as follows.

1. In a pressurized fluid system including a fluid line and a pressure sensing device having a casing in communication with said line, and means for testing said pressure sensing device without removing the same from the system, said testing means comprising a pressure testing gauge removably connected to said casing and subjected to pressure of fluid in the casing, and means for discharging fluid from the casing to the atmosphere at a substantially greater rate of flow than fluid enters the casing from said line, whereby the fluid pressure in the casing may be quickly varied without materially affecting the fluid pressure in said line.

2. The system as defined in claim 1 which is further characterized in that fluid enters said casing from said line through a restricted orifice, said means for discharging fluid from the casing to the atmosphere comprising a variable flow valve having a flow capacity substantially greater than the flow through said restricted orifice.

3. The system a defined in claim 2 together with means for pre-adjusting the rate of fluid flow through said restricted orifice.

* * * * *